United States Patent
Schlangen (10) Patent No.: US 6,727,599 B2
(45) Date of Patent: Apr. 27, 2004

(54) GENERATOR SYSTEM FOR A MOTOR VEHICLE AS WELL AS A METHOD FOR CONTROLLING AN INVERTER OF AN ASYNCHRONOUS GENERATOR

(75) Inventor: Günter Schlangen, Landsberg (DE)

(73) Assignee: Continental Isad GmbH & Co. oHG, Landsberg (DE)

( * ) Notice: Subject to any disclaimer, the term of this patent is extended or adjusted under 35 U.S.C. 154(b) by 74 days.

(21) Appl. No.: 10/200,463

(22) Filed: Jul. 22, 2002

(65) Prior Publication Data

US 2004/0012203 A1 Jan. 22, 2004

(51) Int. Cl.$^7$ ................................................. H02P 9/04
(52) U.S. Cl. ..................... 290/40 B; 290/40 C; 322/25; 123/179.28
(58) Field of Search ............................. 290/40 B, 40 C; 322/25, 28, 14; 123/179.28

(56) References Cited

U.S. PATENT DOCUMENTS

| | | | | |
|---|---|---|---|---|
| 3,675,117 A | * | 7/1972 | Reimers | 322/31 |
| 4,338,525 A | * | 7/1982 | Kilgore | 290/17 |
| 5,742,515 A | * | 4/1998 | Runkle et al. | 700/287 |
| 5,900,722 A | * | 5/1999 | Scott et al. | 322/46 |
| 6,144,190 A | * | 11/2000 | Scott et al. | 322/25 |
| 6,177,734 B1 | | 1/2001 | Masberg et al. | 290/31 |
| 6,274,942 B1 | * | 8/2001 | Pels | 290/40 B |
| 2002/0020381 A1 | * | 2/2002 | Pels | 123/179.3 |
| 2003/0155893 A1 | * | 8/2003 | Schreiber | 322/12 |

FOREIGN PATENT DOCUMENTS

WO  WO 97/08456  3/1997

OTHER PUBLICATIONS

J. Schorner, "Bezugspannung zur Umrichtersteuerung", ETZ–B, vol. 27, 1975, No. 7, pp. 151–132 (1975) (Copy of English abstract included).

R. Bohnert, Ru–Song Wu, "Improved three phase pulse-width modulator for overmodulation", IEEE IAS84:29B, pp. 784–786 (1984).

J.A. Houldsworth, D.A. Grant, "The Use of Harmonic Distortion to Increase the output voltage of the three phase PWM inverter", IEEE Trans. Int. Appl., 1A–20, No. 5, pp. 1224–1228. (1984).

* cited by examiner

*Primary Examiner*—Nicholas Ponomarenko
(74) *Attorney, Agent, or Firm*—Marshall, Gerstein & Borun LLP (57) ABSTRACT

The invention relates to a generator system for a motor vehicle, which comprises an asynchronous generator and a converter. The converter serves for the production of converter output voltages from a direct current source, which form a three-phase system which, inside the machine, produce a rotating field suitable for the generator function for the formation of rotating fields suitable for the generator function. The converter output voltages thereby have a frequency—referred to in the following as a CO frequency—which is changeable in dependence on the range of rotational speed of the generator. The voltage curve of the converter output voltages can be broken down into a primary component with a sinusoidal voltage curve of the CO frequency and into at least one additional secondary component with a sinusoidal voltage curve with an odd-numbered multiple of the CO frequency. The components are directed in such a manner that the amplitude of the primary component is greater than the amplitude of the voltage curve of the converter output voltages, so that a voltage magnification is achieved through this. The invention is also directed to a process for the activation of a converter of an asynchronous generator.

16 Claims, 4 Drawing Sheets

FIG. 4 sin ωt
FIG. 5

FIG. 6 sin ωt + 1/6 sin 3ωt
FIG. 7

FIG. 8 sin ωt + 1/3 sin 3ωt + 1/5 sin 5ωt +...
FIG. 9

GENERATOR SYSTEM FOR A MOTOR VEHICLE AS WELL AS A METHOD FOR CONTROLLING AN INVERTER OF AN ASYNCHRONOUS GENERATOR

FIELD OF INVENTION

The invention relates in general to generator systems for motor vehicles and, in particular, to a generator system for a motor vehicle comprising an asynchronous generator and a converter, as well as a process for the activation of the converter.

BACKGROUND OF THE INVENTION

Because of progress in the area of power electronics, rotating field drive units supplied with power by converters have become more widespread, such as in machine tool-making machines and in rail vehicles, for example, over the course of the past 25 years. For the operation of a rotating field motor, it is generally necessary to provide an alternating current system in the machine, the frequency of which system is changeable. So-called converters, which are able to generate alternating currents of any frequency desired, mostly on the basis of an alternating current source of set frequency, such as 50 Hz power line frequency, through a direct current power supply network, for example, are able to do this, A converter consequently comprises a rectifier, which converts an alternating current into a direct current, and a converter, which in turn produces an alternating current or an alternating current of variable frequency, as the case may be, from a direct current.

Converters which carry out a sinus-evaluated pulse width modulation and which therefore produce rectangular pulses, for example, which yield, on average, an approximately sinusoidal voltage curve, are usually used. In an earlier publication (J. Schörner, Reference voltage for converter control in: ETZ-B, Volume 27, 1975, page 7), it was proposed, in an asynchronous drive unit, to superimpose a third harmonic oscillation on the sinusoidal voltage curve, or else to select a rectangular voltage curve. This should serve for the purpose, on the one hand, of exposing the semiconductor switch in the converter that is sensitive to the voltage of that time to only aslittle voltage as possible but, on the other hand, to make an effective voltage amplitude that is as high as possible available for the operation of the motor. A similar point is known from R. Bohnert, Ru-Song Wu, Improved three-phase pulse Grant, The use of harmonic distortion to increase the output voltage of a three-phase PWM inverter in IEEE Trans. Int. Appl., Volume 1A-20, No. 5, 1984.

It was proposed at an earlier date to use rotating field machines in synchronous- or asynchronous construction as combined generators and starters in the motor vehicle and, specifically so, particularly as so-called "crankshaft starting generators" (see WO 97/08456, for example). These proposals are connected with the awareness that considerable additional savings in fuel consumption are possible through the fact that mechanically-operated auxiliary aggregates, such as internal combustion engine valve controls, air conditioner compressors, and servomechanisms for steering and braking, are switched over to an electrical drive. The novel motor vehicle generators proposed can provide the electrical performance that is thereby necessary over the great range of speed that arises, and with a high level of efficiency.

SUMMARY OF THE INVENTION

The invention provides, in accordance with a first aspect, a generator system, particularly for a motor vehicle, which comprises an asynchronous generator and a converter. The converter serves for the production of converter output voltages from a direct current source which form a three-phase system, which produce, for the formation of rotating fields that are suitable for the generator function, a rotating field in the machine that is suitable for the generator function. The converter output voltages have a frequency—referred to in the following as the "CO frequency"—that can be changed in dependence on the range of the generator speed. The voltage curve of the converter output voltages can be broken down into a primary component with a sinusoidal voltage curve of the CO frequency, as well as into at least one additional secondary component with a sinusoidal voltage curve with an odd-numbered multiple of the CO frequency. The components are thereby weighted in such a manner that the amplitude of the primary component is greater than the amplitude of the voltage curve of the converter output voltages, so that a voltage magnification is brought about through this.

In accordance with one additional aspect, the invention is directed to a method for the activation of a converter of a synchronous generator, particularly for a motor vehicle. It serves for the production of converter output voltages from a direct current source, which form a three-phase system and which produce a rotating field for the generator function in the machine that is suitable for the formation of rotating fields suitable for the generator function. The converter output voltages have a frequency (CO frequency) that can be changed in dependence on the rotational speed of the generator. The voltage curve of the converter output voltages can be broken down into a primary component with a sinusoidal voltage curve of the CO frequency, as well as into at least one additional secondary component with a sinusoidal voltage curve with an odd-numbered multiple of the CO frequency. The components are thereby weighted in such a manner that the amplitude of the primary component is greater than the amplitude of the voltage curve of the converter output voltages, so that a voltage magnification is brought about by this means.

DESCRIPTION OF THE DRAWINGS

The invention will now be illustrated in further detail by means of examples of implementation and drawings by way of example. The schematic drawings depict the following.

In the drawings, corresponding elements bear the same reference numbers.

DESCRIPTION OF THE PREFERRED EMBODIMENTS

Figure 1:
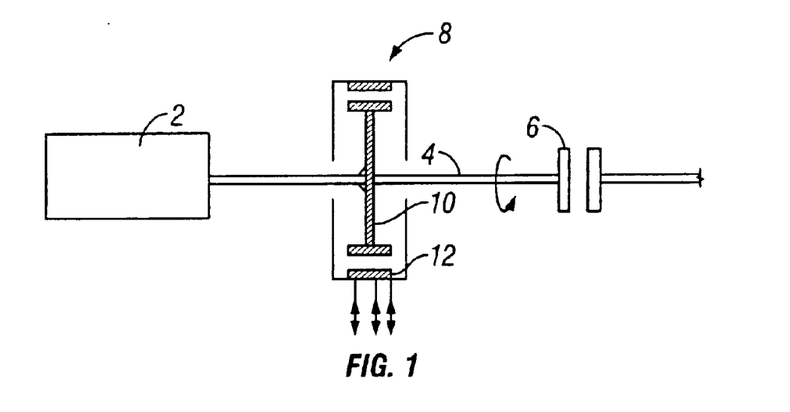
FIG. 1: A depiction of a crankshaft starting generator.

Before the generator system in accordance with FIG. 1 is illustrated in further detail, a number of clarifications of terms and remarks on the examples of implementation disclosed will first appear.

In the preferred forms of implementation, a rotating field asynchronous machine that is variable in its rotational speed comprises essentially one rotor solidly fixed to the rotational axis, a stator which encompasses but does not jointly rotate with the rotor, and a cooling system. The stator is equipped with one winding wire for each phase. In a three-phase system, phase-displaced alternating currents, the corresponding currents of which produce a continuously-rotating stator field, are applied to the said stator at the interval of 120 degrees each. In contrast to synchronous machines, the rotors of which are stimulated either by permanent magnets or by the coupling of a current or of a magnetic field, the magnetic field of the rotor is brought about, in asynchronous machines, by a voltage which is induced in the rotor coil by the rotating stator field. The rotor coils of an asynchronous machine are thus generally configured as short-circuit coils. In order for an induced field to arise in the short-circuit rotor, a difference must be present between the rotor and the rotating stator field: that is to say, the rotor rotates either more slowly (motor operation) or more rapidly (generator operation) than the rotating stator field does.

Not only in the motor operation (which is optional here), but also in the generator operation as well, three alternating currents (in the case of a three-phase system) are, for the production of the rotating stator field applied to the stator. The stator voltage is superimposed with an induced counter-voltage, which thus brings it about that the rotating field of the rotor in turn induces a voltage in the stator coils which, in a simplified consideration of the voltage applied, is directed in the opposite direction. This induced counter-voltage increases with increasing rotational speed of the rotor. If it reaches the same amount as the stator voltage applied, then the electrical machine can not issue any more output.

In the preferred forms of implementation, the stator voltages that are necessary for the production of the rotating field are made available by a converter: that is to say, the converter output voltages are conveyed to the coils of the stator. If a voltage curve of the converter output voltages is referred to in the following, then it is the temporal current of the voltage, and therefore the function of the voltage in dependence on the time, that is thereby intended. This temporal voltage curve is periodic; that is to say, it is repeated with the CO frequency f. This is, however, to be distinguished from the rotational speed n of the machine which, in multi-pole machines, can deviate from the CO frequency f, whereby the CO frequency f in the asynchronous generator results from the multiplication of the rotational speed n by the number of pairs of machine poles, with consideration of the creepage.

The very great range of rotational speed of the generator is thereby determined by the rotational speeds arising on the crankshaft of a motor vehicle, which speed lies, for example, in the range between 5000 and 6000 revolutions per minute and, during the driving operation, depends upon the driving speed of the motor vehicle. With a typical number of 6 pairs of machine poles, CO frequencies of between 50 and 600 Hz are obtained. In the preferred design as a crankshaft generator, the rotor of which runs at the same rotational speed as the crankshaft, the same range of rotational speed arises for the electrical machine. Upon the use of an intermediate transmission (such as in a crankshaft generator in the form of a planetary gear drive, for example), the range of rotational speed of the electrical machine is derived from this through multiplication by the transmission ratio. The CO frequency, for its part, is adjusted to the range of rotational speed of the machine and follows the different rotational speeds.

The form of the periodic voltage curve can, for example, be a sinus function or a rectangular function. Since this involves a periodic voltage curve, it can be broken down into a Fourier series. The primary component of this Fourier factorization, and thus of the basic oscillation, is a sinusoidal voltage with the same frequency—that is to say, the CO frequency—as the original voltage curve. Furthermore, the voltage curve can contain additional secondary components, so-called "harmonic oscillations", which have a sinusoidal voltage curve with a multiple of the CO frequency of the primary components. Through a corresponding weighting of the primary- and secondary components, a special voltage curve of the converter output voltages, which is referred to in the following as the "activation function", then results. In the preferred form of implementation, it is brought about, through the special weighting of the primary- and secondary components, that the amplitude of the primary components is greater than the amplitude of the voltage curve of the activation function, so that a voltage magnification is brought about by this. The voltage magnification relates, therefore, to the amplitude of the basic oscillations contained in the activation function relative to the amplitude of the activation function itself. Because of the symmetry of the activation functions, even-numbered Fourier components play no role here.

The harmonic oscillations are disadvantageous, on the one hand, since they do not contribute to the electrical effective power, but instead produce vibrating momentum that acts on the level of efficiency in a degrading manner. This is not applicable, in any event, for harmonic oscillations with frequencies that are a multiple of the number of phases of the basic frequency (thus, in a three-phase current, for example, the 3rd, the 6th, the 9th, etc., harmonic oscillation), since these emerge from the contributions of the specific other phases. On the other hand, they permit the voltage magnification of the basic oscillation, and thereby an increase of the power output, particularly in the high range of rotational speed. This is supported by the fact that the induced counter-voltage rises with increasing rotational speed. With increasing rotational speed, an effort is therefore made to increase the converter current correspondingly. With a given rotational speed, however, the maximum possible voltage is reached. From then on, the difference between the converter current and the induced counter-voltage that is decisive for the output is reduced, so that the output is increasingly reduced. Through the voltage magnification of the basic oscillation, however, an increasing of this voltage difference, which is decisive for the power output, is effectively achieved without the maximum converter output voltage having to be increased. The reason for this lies in the fact that the induced counter-voltage contains only a "counter-basic oscillation", but practically no harmonic oscillations, however. For the difference between the voltage applied and the induced counter-voltage which determines the output, therefore, only the basic oscillation is to be taken into consideration whereas, for the voltage maximum to be produced by the converter, however, it is the total voltage that is to be taken into consideration (basic oscillation, including all harmonic oscillations).

The preferred forms of implementation involve a generator system, which is configured both as a generator as well as a motor for starting the motor vehicle internal combustion engine. The machine is therefore dimensioned in a sufficiently torque-resistant manner for the internal combustion engine to be able to start directly—that is to say, it can start without effective oscillation function and, preferably, without a special starter gear reduction as well.

The asynchronous generator is seated directly on the crankshaft, while its rotor is preferably coupled with the crankshaft in a manner without gears. This form of implementation is very advantageous in regard to low levels of wear and noise.

In the examples of implementation depicted, a voltage in the low voltage range serves for the supplying of power to the generator system. This preferably involves a vehicle battery, especially a starter battery. The upper limit of the low voltage range lies where electrical motor vehicle equipment is supposed to still be provided without special contact protection for parts conducting voltage, such as at 42 or 48 volts, for example. The range therefore comprises, for example: 0–42 volts, or 0–48 volt, as the case may be.

One possible form of implementation of the generator system has, in the converter output voltages, one or more sinusoidal secondary components that are an odd-numbered multiple of the basic frequency, whereby at least one secondary component is contained, however, which is not 3·m times the basic frequency, whereby m is a whole natural number. As a general rule, the converter produces three-phase alternating currents, the phases of which are each phase-displace to one another by 120°. Differences of the three-phase voltages are usually applied to the stator coil wires in a so-called "bridge circuit". This has the result that, because of the special position of 120°, harmonic oscillation portions of phase voltages which have 3- 6-, 9-, etc., times the basic frequency mutually cancel one another out, and thus provide no contribution to the rotating field. This is advantageous, since these special harmonic oscillations otherwise produce vibrating momentums, and thus cause a worsening of the level of efficiency. On the other hand, the voltage magnification upon the use of 3·m times harmonic oscillations is not the maximum that can be achieved. If a voltage magnification that exceeds this is desired, then harmonic oscillations which do not constitute 3·m times the basic oscillation are to be referred to.

One possibility for further enlarging the voltage magnification is the application of infinitely many odd-numbered harmonic oscillation portions which, after Fourier analysis, yields a rectangular function of the converter output voltages. Such a rectangular function supplies the maximum possible increase of voltage.

A voltage magnification, particularly one that does not have 3·m times the basic frequency, does have its value, however: specifically, the reduction in the level of efficiency for reason of the production of vibrating momentum that has already been mentioned. In order to not have to take accept any such reduction in the level of efficiency at lower rotational speeds, where the limitation of the converter current simply does not have a performance-restricting effect, the preferred forms of implementation for different frequency ranges of the converter output voltages have two or more different voltage curves with different voltage magnifications, whereby the voltage magnification in the upper frequency range is greater than in the lower frequency range. The event that the voltage magnification disappears, and therefore assumes the value "zero", is also explicitly included here. In one form of implementation, for example, the converter output voltages in the lower range of rotational speed could have a purely sinusoidal voltage curve without voltage magnification and, in the upper range of rotational speed, they could have a corresponding voltage magnification through inclusion of the third harmonic oscillation.

In one particularly preferred form of implementation, the voltage curve of the converter output voltages in the lower range of rotational speed can be broken down into the basic oscillation or into the basic oscillation and the third harmonic oscillation, so that no losses arise there from harmonic oscillations, if the high-frequency harmonic oscillations that arise from pulsing are disregarded.

In the particularly preferred forms of implementation, the voltage curve of the converter output voltages in the upper range of rotational speed can be broken down into a basic oscillation and one or more harmonic oscillations, the frequency of which is an odd-numbered multiple of the basic frequency, which is not 3·m times the basic frequency. Because of that, the voltage magnification in the upper frequency range is increased still further beyond what can be achieved by the third harmonic oscillations. Forms of implementation in which, in the lower range of rotational speed, a pure sinusoidal voltage curve without voltage magnification is selected and, in the upper range of rotational speed, a voltage curve is selected with a specific voltage magnification which can be broken down into a basic oscillation and into one or more harmonic oscillations, the frequency of which is 3·m times the basic frequency, are also conceivable, however. The latter could consist of a basic oscillation with its third harmonic oscillation, for example.

Particularly preferably, "all" odd-numbered harmonic oscillations are added into the converter output voltages in the upper frequency range. The voltage curve of the converter output voltages then has the form of a rectangular function alternating with the basic frequency between two constant voltage levels. Such a voltage curve achieves a maximum possible voltage magnification in the upper frequency range.

The transition from one voltage curve to another can, in the forms of implementation disclosed, be carried out in different ways and methods—such as, for example, if, at a strictly defined frequency, switching is carried out abruptly between the two voltage curves, or if a continuous transition takes place from one voltage curve to the next at a certain frequency range, whereby the voltage curves appear in mixed form in the transition range: that is to say, for example, the distance to the boundaries of the area are weighted correspondingly.

The principle of operation of the generator system will now be illustrated by referring back to FIG. 1. The preferred forms of implementation involve a combined starter generator of a motor vehicle with an internal combustion engine. Particularly preferably, it involves a so-called crankshaft starter generator, and thus a combined starter and generator, the rotor of which is seated directly on the crankshaft, or an extension of the crankshaft, of the internal combustion engine, and preferably rotates with this permanently and without intermediate transmission. Such types of crankshaft starter generators have a performance in the range from 4 KW to 30 KW and, in a mid-level passenger vehicle, for example, of 10 KW.

FIG. 1 depicts a motor vehicle drive system with such a crankshaft starter generator and, specifically so, the drive system has an internal combustion engine 2 which imparts torque, through a drive shaft 4 (such as the crankshaft, for example), a coupling unit 6, and additional parts of a drive rod (not depicted), onto the drive wheels of the vehicle. An asynchronous three-phase machine 8 which functions as starter and generator is seated on the drive shaft 4. It has a rotor 10 which is seated directly on the drive shaft 4 and is connected with it in a non-rotating manner, as well as a stator 12 supported on the casing of the internal combustion engine 2, for example. The electrical asynchronous machine 8 and the internal combustion engine 2 run permanently together; the starting of the internal combustion engine 2 takes place directly without transmission. The coil of the stator 12 (not depicted here) is supplied with power by a converter with electrical currents and voltages of freely-adjustable amplitude, phase, and frequency.

Figure 2:
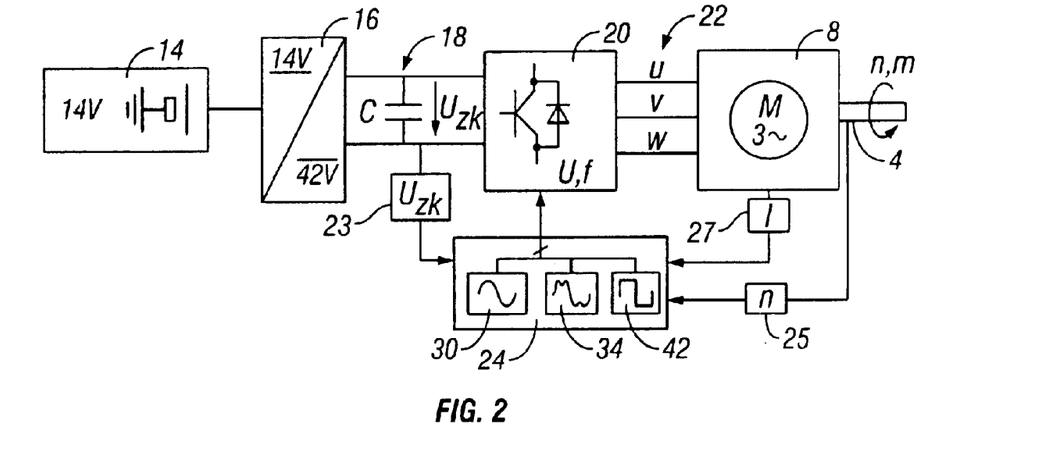
FIG. 2: A circuitry diagram of an asynchronous machine which is variable in its rotational speed.

A circuit diagram of the generator system is depicted in FIG. 2. A 14-volt (92-volt nominal voltage) direct current battery 14, the voltage of which is raised, in a direct current converter 16, from 14 volts to 42 volts (36-volt nominal voltage), for example, serves as a voltage source. In other examples of implementation (not depicted), a 42-volt battery is provided instead of the 14-volt battery and voltage converter, or work is carried out with a 14-volt intermediate circuit voltage (if the 14-volt battery here were to lie directly within the intermediate circuit, the intermediate circuit would—strictly speaking—be termed an "input circuit"). The 42-volt low voltage is applied to an intermediate circuit storage device 18, a series connection and, if applicable, a parallel circuit of several condensers. With the help of the pulse width modulation process, a pulse converter 20 produces three-phase alternating currents from the 42-volt direct current voltage of the intermediate circuit 18. These are applied to the corresponding stator coils of the asynchronous machine 8, and thus produce the rotating stator field which is necessary for the generator function in which the rotor, which is solidly connected with the drive shaft 4, rotates with the rotational n. The intermediate circuit storage device 18 essentially has the task of supplying voltage to the pulse converter 20 with that high edge steepness which is necessary for the clocking of the pulses.

At every point in time, a control device 24 specifies to the converter 20 through the corresponding triggering of its semi-conductor switch, which amplitude, frequency, and phase the alternating currents produced by it should have, whereby the intermediate circuit voltage $U_{ZK}$ measured with the voltage measuring device 23 is used for the control. In the preferred forms of implementation, the control device 24 is formed by a correspondingly programmed microcomputer system.

The semi-conductor switches of the converter 20 are preferably formed by MOSFET's or IGBT's with operating frequencies above 10 kHz.

Figure 3:
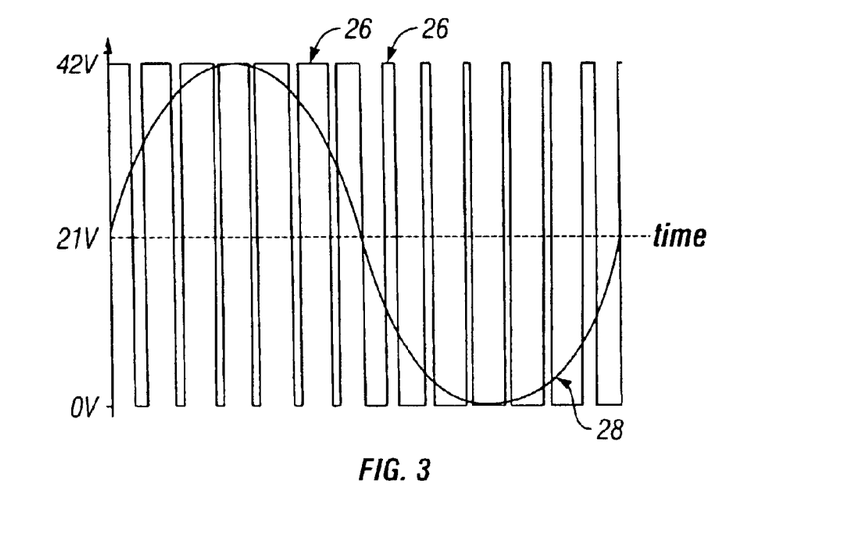
FIG. 3: A depiction of a pulse width modulation serving for the purpose of clarification.

The principle of the pulse width modulation is illustrated in FIG. 3 by means of one example. The converter, controlled by the control unit 24 from FIG. 2, produces 42 volts here with a fixed switching frequency pulse 26 of a constant voltage level. In the example depicted, the width of the pulses varies in a sinusoidally-evaluated manner. The basic oscillation of the pulse pattern 26 is the sinusoidal voltage 28 oscillating with the basic frequency. This basic oscillation 28 results in a good approximation through a temporal averaging of the pulses 26 or, expressed in the frequency pattern, as a basic oscillation (1st component) of the Fourier spectrum of the pulse pattern 26. The pulse width modulation is, for the purpose of greater clarity, depicted in FIG. 3 with a relatively smaller clock pulse frequency. In actual fact, the clock pulse frequency is, in the preferred forms of implementation, at least two orders of magnitude above the frequency of the basic oscillation. In the frequency range, the temporal averaging corresponds to a filtering of the high pulse frequency. The inductivity of the electrical machine has a suitable low pass effect, so that the currents flowing in the coils are, in fact, averaged in the above sense. In regard to the voltages, essentially no such averaging takes place in the machine; it is, rather, only a conceptual value. Therefore, if a voltage curve with a sinusoidal basic oscillation and a third harmonic oscillation is under discussion here, then it is, strictly speaking, a correspondingly evaluated pulse width of modulated rectangle voltage curve which, upon an (imaginary) temporal averaging, would show the stated current, that is meant here. In actual fact, however, because of the high frequency clocking of the pulses, correspondingly high-frequency harmonic oscillations, which do not contribute to the voltage magnification but which lead, instead, to certain losses and pendulum momentums, also appear in a "pure" sinusoidal voltage curve. Because of the frequency variability that can be achieved by means of this technique, however, these are tolerated.

The maximum possible amplitude of the basic oscillation 28 of 21 volts is depicted in FIG. 3. Depending on the selection of the pulse width of the pulses 26, however, lower amplitudes of the basic oscillation 28 can also be set. The repetition period of the pulse pattern 26 determines the frequency of the basic oscillation 28 and a starting time of its phases. Consequently, through the variation of the pulse pattern 26, a basic oscillation 28 can be prepared, with any amplitude, frequency, and phase desired.

With the help of this pulse width modulation process—as has been mentioned—, not only can sinusoidal converter output voltages 28 be produced, but also voltage curves of any desired form, such as rectangular functions or voltage curves, for example, which result from special weightings of basic oscillations and the harmonic oscillations of the same. The voltage curves and the corresponding pulse patterns are first of all computed and prepared in the control unit 24, either filed in integrated switching circuits (IC)—as hardware—, or in microprocessor circuits in EPROM's—as software.

Figure 4:
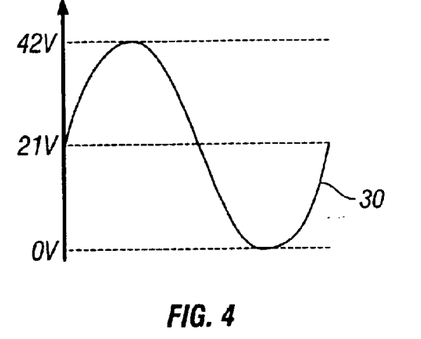
FIGS. 4, 6, 8: Different activation functions of a coverter of the the asynchronous machine.
Figure 5:
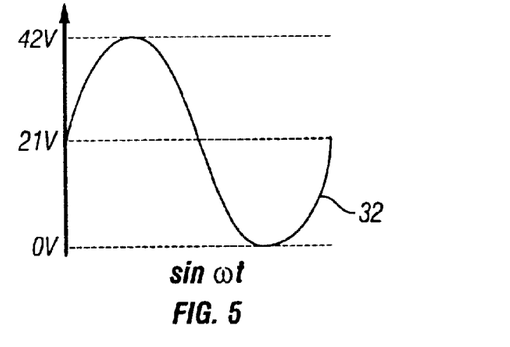
FIGS. 5, 7, 9: The basic—and harmonic oscillations specifically corresponding to the activation functions.
Figure 6:
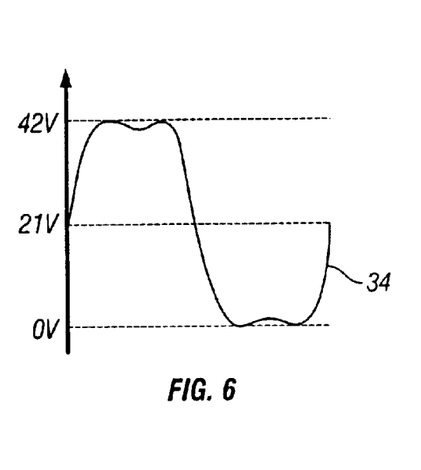
Figure 7:
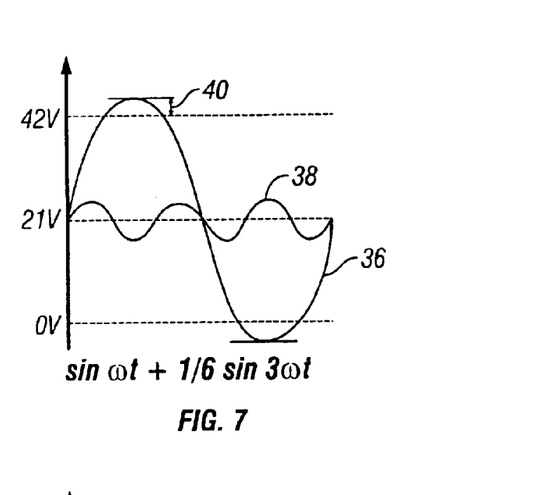
Figure 8:
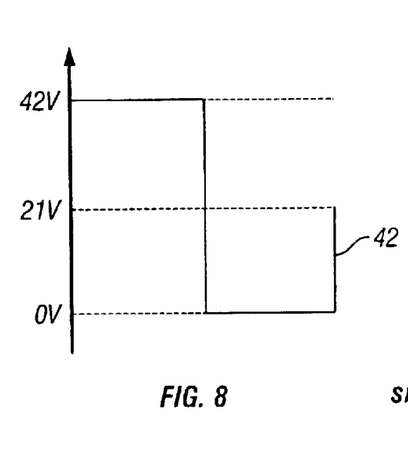
Figure 9:
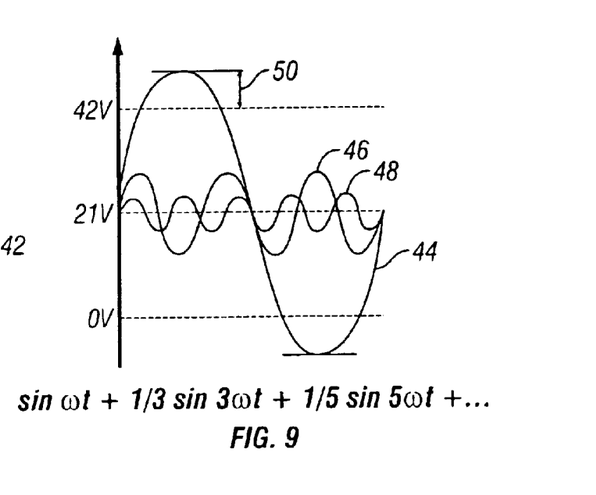

Different types of converter output voltages are outlined in FIGS. 4, 6, and 8, and the corresponding base- and harmonic oscillations of the same are depicted in FIGS. 5, 7, and 9. The voltage curves 30, 34 and 42 are—as mentioned above—produced with the help of the pulse width modulation process. The control function 30 represents a pure sinusoidal voltage, so that its Fourier factorization consists only of a basic oscillation of the same frequency (referred to in the following as "sinus activation function"). No voltage magnification thus arises in the sinusoidal activation function 30.

The activation function 34 can be conceptually broken down into a basic oscillation of the same frequency 36 and a harmonic oscillation of the three-fold frequency 38, whereby the weighting of the harmonic oscillation relative to the basic oscillation amounts to ⅙ (referred to in the following as the "1+3 activation function"). The voltage magnification 40 is defined as the difference of the amplitude of the basic oscillation and of the maximum amplitude of the activation function relative to the latter, and yields approx. 15% for the activation function 34.

The "rectangular activation function" 42, and its first three Fourier components, the basic oscillation 44, the third harmonic oscillation 46, and the fifth harmonic oscillation 48, is presented as a third example of implementation of an activation function, whereby the third harmonic oscillation is weighted with the factor ⅓ and the fifth harmonic oscillation is weighted with the factor of 1⅕, relative to the basic oscillation. In order to achieve the ideal case of a rectangular function 42, the factorization must additionally be correspondingly continued into infinity. In practical terms, a rectangular function 42 is obtained, for example, through simple switching on and off. The voltage magnification 50 is, in this case, the maximum attainable, and is computed at approx. 27%, which corresponds to an increase of approx. 12% relative to the voltage magnification 40 of the 1+3-activation function 34.

Figure 10:
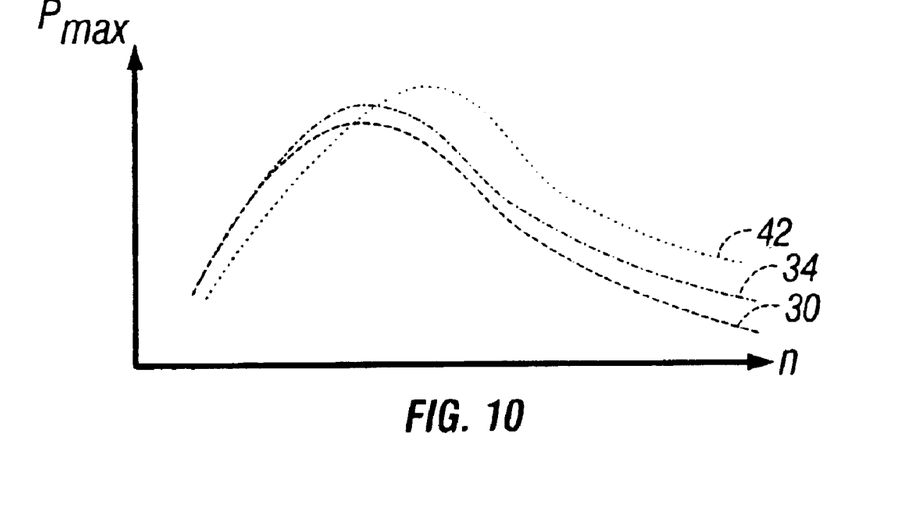
FIG. 10: A depiction of the dependency of the maximum output of an asynchronous generator on its rotational speed for different activation functions.

FIG. 10 schematically depicts the theoretical dependency of the maximum generator output on the rotational speed n of the generator axis, for the three different activation functions 30, 34, and 42 from FIGS. 4, 6, and 8. First of all, the theoretical form of the output curve should be discussed briefly. The nearly linear increase of the output curve for small rotational speeds (the so-called "armature adjustment range") lies in the fact that, in this case, the current is kept essentially constant, since the converter output voltages are increased corresponding to the increase of the induced counter-voltage, through which the voltage difference responsible for the current—the voltage effectively applied—remains constant, and the generator momentum thereby remains constant. The increase is then based on the fact that the generator output P with constant torque M rises proportionately with the rotational speed n (P~n×M). For high rotational speeds (the so-called "field adjustment range"), the output drops with 1/n. The reason for this is the fact that the increase of the induced counter-voltage can no longer be compensated here any longer through a corresponding increase of the converter output voltage, so that the voltage effectively applied, and thereby the current and generator momentum, decrease with increasing rotational speed. The range of rotational speed is, for conventional internal combustion engines, extended from 0500 (starting) to approx. 6000 revolutions per minute and, upon starting in the motor operation of the crankshaft generator, from 0 to 500 revolutions per minute.

Deviations are now brought about through voltage magnification and a reduction of the efficiency level, with harmonic oscillations not ceasing. The voltage magnification of the 1+3-activation function 34 brings it about that the counter-voltage range only begins at higher rotational speed, and the output curve there lies above the sinus activation function 30, which has no voltage magnifications. According to the findings of the inventor, it is anticipated that, with a rectangular activation function 42, the counter-voltage range begins with a still higher rotational speed, and that the rectangular activation function 42 there lies, on the other hand, above the 1+3 activation function 34. In the armature adjustment range, the output curves of the sinus activation function 30 and of the 1+3-activation function 34 proceed identically, since the third harmonic oscillations stand out. On the basis of the reduction of the level of efficiency upon the rectangular activation function 42, it is expected, in accordance with the current knowledge, that, in the armature adjustment range, the corresponding output curve lies somewhat below the output curve of the sinus activation function 30 and of the 1+3-activation function 34.

Figure 11:
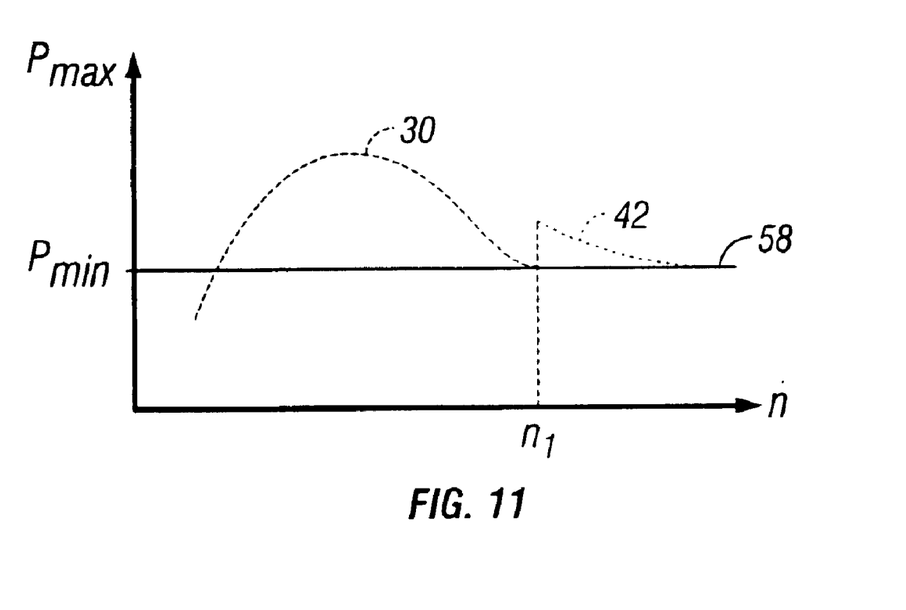
FIG. 11: A depiction of the dependency of the maximum output of the asynchronous generator on its rotational speed upon the use of different activation functions.

The output curve resulting from the combined use of two activation functions, in dependence on the rotational speed, is depicted in FIG. 11. In the armature adjustment range, and in a lower portion of the field adjustment range up to a rotational speed $n_1$, the sinus activation function 30 is used. From the rotational speed $n_1$, a changeover to the rectangular activation function 42 is carried out. In the preferred examples of implementation, the transitional rotational speed $n_1$ lies where the sinus activation function 30 falls short of a predetermined minimum output $P_{min}$. In other examples of implementation (not depicted), $n_1$ lies where the sinus activation function 30 falls short of the rectangular activation function 42 whereby, for the control of the changeover process, the rotational speed n is measured with the help of a rotational speed sensor 25. The former guarantees that at least the minimum output is stated, while the latter guarantees that the output of the asynchronous generator issued is maximally above the entire range of rotational speed. In other examples of implementation (not depicted), the changeover is carried out in dependence on the user; that is to say, a changeover to an activation function, with a greater voltage magnification and, consequently, with a higher output, is carried out independently of the rotational speed if the activation function applied can no longer provide the power required by the user in the motor vehicle. The control 24 (FIG. 2) of this changeover process is thereby carried out, for example, by measuring an electrical parameter dependent on the output of the generator system (such as the machine current 1, for example) by means of the measuring device 27, and [the measuring] of the rotational speed n of the machine is carried out with the measuring device 25. In still one other form of implementation (not shown), the 1+3-activation function 34, for which the above illustrations and FIG. 11 are correspondingly applicable, is used in the armature adjustment range instead of the sinus activation function 30.

Figure 12:
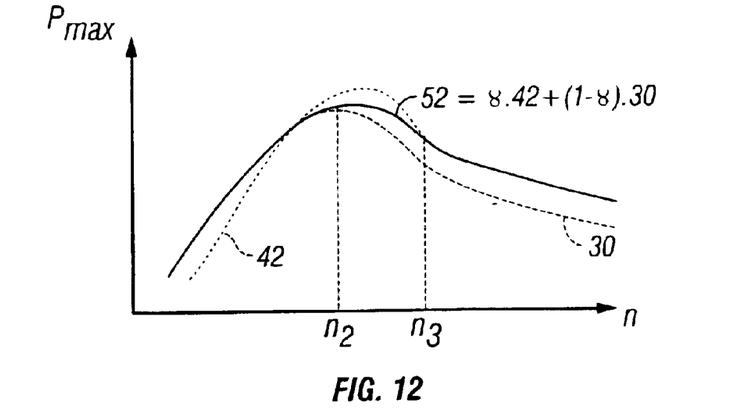
FIG. 12: A depiction of the dependency of the maximum output of the asynchronous generator on its rotational speed upon the use of a superimposition of different activation functions.
Figure 13:
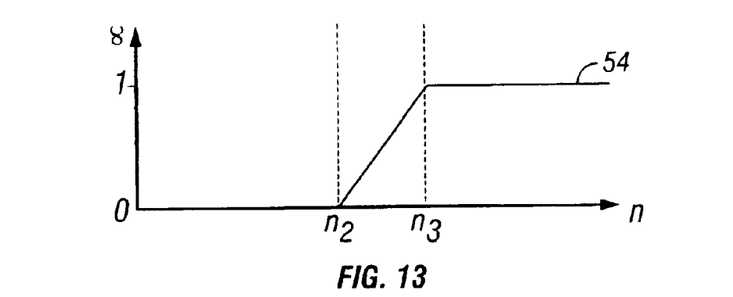
FIG. 13: A depiction of the dependency of the superimposition of different activation functions on the rotational speed of the asynchronous generator.

In FIG. 12 and FIG. 13, a situation analogous to FIG. 10 or 11, respectively, is depicted for further preferred examples of implementation, but here, however, a changeover from one activation function to another is not carried out at a specific rotational speed $n_1$ but, rather, the changeover process instead takes place at a range of rotational speed between the rotational speeds $n_2$ and $n_3$. On the other hand, the output curve of the rectangle activation function 42 and of the sinus activation function 30 is depicted in FIG. 12. Instead of the sinus activation function 30, the 1+3-activation function 34, for which FIGS. 12, 13, and 14, as well as the following illustrations, are analogously applicable, is used in another form of implementation (not depicted).

The activation function 52 results from the superimposition of the previously stated activation functions with the weighting factor γ, which is depicted in FIG. 13 and varies over the frequency range. The resulting activation function 52 is obtained mathematically as an addition of the activation function 42 multiplied by γ, and of the activation function 30 multiplied by the factor (1−γ).

One additional possible control function (not depicted) is a sinus activation function with an amplitude of at least 21 volts, the zero line of which lies at 21 volts and the amplitude of which is cut off at 42 volts or at 0 volts, respectively, that is to say, is kept at a constant level. At rotational speeds of less than $n_2$, an amplitude of precisely 21 volts is selected, so that a pure sinus activation function results at this range of rotational speed. In the transitional range, the amplitude of the sinus activation function is continuously increased from 21 volts at the rotational speed $n_2$ up to infinity at the rotational speed $n_3$, so that a purely rectangular function is obtained for rotational speeds from $n_3$.

Figure 14:
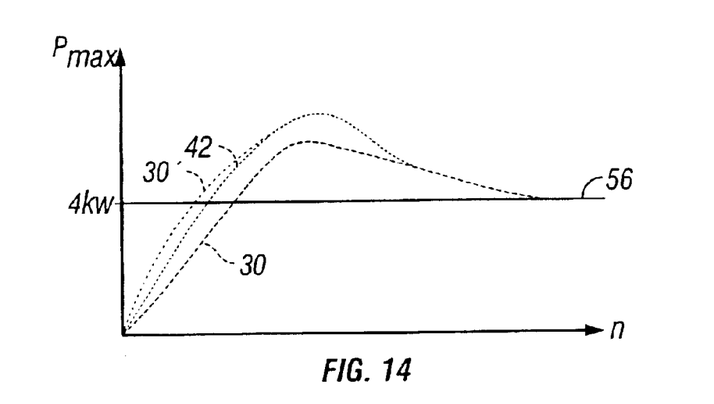
FIG. 14: A depiction of the dependency of the maximum output of the asynchronous generator on its rotational speed for different activation functions, and designs of the asynchronous machine.

FIG. 14 depicts the course of the output curve in dependence on the rotational speed of the generator for the sinus activation functions 30 and the rectangular activation function 42 but, in contrast to FIGS. 10, 11, and 12, however, for specific, differently-designed machines and, specifically so, in such a manner that the outputs of the different machines are each equal at the highest rotational speed. As mentioned above, because of the voltage magnification, a higher output can be achieved with rectangular activation function 42 at high rotational speeds than with the sinus activation function 30. On the other hand, however, this also means that the asynchronous machine, in order to achieve a predetermined final output at high rotational speeds, can be designed more favorably upon the use of the rectangular control function 42 than upon the use of the sinus activation function 30. A more favorable design, for example, would be an increase in the number of windings upon the use of the rectangular activation function 42, from which, with an equal current flow, a greater magnetic flow—and thereby a greater torque—results in the armature adjustment range. The increase of the induced counter-voltage in the armature adjustment range that results from that is compensated by the voltage magnification of the rectangular activation function 42.

It is usually desired to reach a predetermined minimum output in the motor vehicle, even at the high range of rotational speed, such as, for example, 4 KW in the range of 5000 revolutions per minute. This boundary condition then determines the design of the asynchronous machine. Two power curves, which are drawn up for the sinus activation function 30 and the rectangular activation function 42 if the asynchronous machine is specifically designed in such a manner that, at a high range of rotational speed, the output curve lies on a 4 KW line 56, are compared in FIG. 14. It is to be noted that the machine with the rectangular activation function 42 in the medium and lower range of rotational speed thereby has a higher maximum output than does the machine with the sinus activation function 30.

In addition, a further improvement in the level of efficiency and also, possibly, an additional improvement of output in the lower range of rotational speed, as depicted by the course of the curve 30', can be achieved in the machine with the rectangular activation function by changing over from the activation function to a sinusoidal course.

The possibility of a change of the activation function dependent on the rotational speed that was additionally described makes it possible, in addition, to avoid an impairment of the level of efficiency, in rectangular-type control functions, in the lower range of rotational speed.

All publications and existing systems that are mentioned in this description are incorporated herein by way of reference.

Although specific methods and products that have been constructed in agreement with the teachings of the invention have been described here, the scope of coverage of this patent is not limited thereto. On the contrary, this patent covers all forms of implementation of the teachings of the invention which fairly fall within the scope of coverage of the appended claims, either literally or in accordance with the doctrine of equivalence.

What is claimed is:

1. A generator system for a motor vehicle comprising:
an asynchronous generator; and
a converter to produce converter output voltages from a direct current source to form a three-phase system to produce a rotating field suitable for a generator function, to thereby form rotating fields suitable for the generator function, wherein the converter output voltages have a CO frequency that is changeable in dependence on a range of rotational speed of the generator, and wherein a voltage curve of the converter output voltages can be broken down into a primary component with a sinusoidal voltage curve of the CO frequency and at least one additional secondary component with a sinusoidal voltage curve with an odd-numbered multiple of the CO frequency, and wherein the components are weighted in such a manner that an amplitude of the primary component is greater than an amplitude of the voltage curve of the converter output voltages, to provide a voltage magnification.

2. A generator system in accordance with claim 1, wherein the asynchronous generator can also be operated as a motor for starting a motor vehicle internal combustion engine.

3. A generator system in accordance with claim 1, wherein the asynchronous generator is seated directly on a crankshaft of the motor vehicle.

4. A generator system in accordance with claim 1, wherein the direct current source is a low voltage source which is configured as a motor vehicle battery or as a 42-volt battery.

5. A generator system in accordance with claim 1, wherein the CO frequency is changeable within a range which is suitable for use in a conventional range of rotational speed of a motor vehicle internal combustion engine.

6. A generator system in accordance with claim 1, wherein the converter is a pulse modulation converter, and the converter output voltages are evened out with respect to the modulation.

7. A generator system in accordance with claim 1, wherein at least one sinusoidal secondary component of the voltage curve has an odd-numbered multiple of the frequency, which is not 3 m times the frequency, whereby m is a natural number.

8. A generator system in accordance with claim 1, wherein the voltage curve of the converter output voltages is an approximately rectangular function alternating with the CO frequency between two constant voltage levels.

9. A generator system in accordance with claim 1, wherein at least two different voltage curves with different voltage magnifications are produced for different frequency ranges of the converter output voltages, wherein the voltage magnification is greater in an upper frequency range than in a lower frequency range, or no voltage magnification is present in the lower frequency range and a voltage magnification is present in the upper frequency range.

10. A generator system in accordance with claim 9, wherein the voltage curve of the converter output voltages in a lower range of rotational speed can be broken down into a primary component with a sinusoidal voltage curve of the CO frequency and at least one secondary component with a sinusoidal voltage curve 3 m times the CO frequency, wherein m is a natural number, or the voltage curve of the converter output voltages in the lower range of rotational speed only has the primary components.

11. A generator system in accordance with claim 9, wherein the voltage curve of the converter output voltages in an upper frequency range can be broken down into a primary component with a sinusoidal voltage curve of the CO frequency, and at least one secondary component with a sinusoidal voltage curve with an odd-numbered multiple of the CO frequency which is not 3·m times the frequency, whereby m is a natural number.

12. A generator system in accordance with claim 11, wherein the voltage curve of the converter output voltages in the upper frequency range is a rectangular function alternating between two constant voltage levels with the frequency.

13. A generator system in accordance with claim 9, wherein the voltage curve of the converter output voltages in the upper frequency range can be broken down into a primary component with a sinusoidal voltage curve of the CO frequency and at least one secondary component with a sinusoidal voltage curve with 3·m times the CO frequency, whereby m is a natural number.

14. A generator system in accordance with claim 9, wherein the transition from one voltage curve to the next one takes place in at least one of the following ways:
  (i) through a changeover from one voltage curve to another at one or more specific frequencies;
  (ii) through a continuous transition, within a specific frequency range, from one voltage curve to another.

15. A generator system in accordance with claim 9, wherein the changeover to a voltage curve with higher voltage magnification, and thereby higher output, takes place in dependence on the user, that is to say, independently of the frequency, if the higher output is actually required by the users in the motor vehicle.

16. A method of activating a converter of an asynchronous generator for a motor vehicle for the production of converter output voltages from a direct current source, which form a three-phase system comprising: producing a rotating field suitable for a generator function, wherein the converter output voltages have a CO frequency that is changeable in dependence on a range of rotational speed of the generator, wherein the voltage curve of the converter output voltages can be broken down into a primary component with a sinusoidal voltage curve of the CO frequency and into at least one additional secondary component with a sinusoidal voltage curve with an odd-numbered multiple of the CO frequency, wherein the components are weighted in such a manner that the amplitude of the primary component is greater than the amplitude of the voltage curve of the converter output voltages, to provide a voltage magnification.

* * * * *